Nov. 17, 1959  E. M. VAN BUSKIRK  2,912,811
FEED MECHANISM FOR CANE HARVESTERS
Filed Jan. 9, 1958  2 Sheets-Sheet 1

INVENTOR.
Ernest M. Van Buskirk
BY Paul O. Pippel
Atty

United States Patent Office 2,912,811
Patented Nov. 17, 1959

2,912,811

FEED MECHANISM FOR CANE HARVESTERS

Ernest M. Van Buskirk, East Moline, Ill., assignor to International Harvester Company, Chicago, Ill., a corporation of New Jersey Application January 9, 1958, Serial No. 707,883

3 Claims. (Cl. 56—15)

This invention relates to a new and improved feed mechanism for cane harvesters.

The harvesting of cane by mechanical means has long been a hurdle over which it has been difficult if not impossible for implement manufacturers to successfully negotiate. It is true that many companies have built mechanical cane harvesting machines of many different types with varying degrees of success. Also, cane is grown in different ways in different countries and different communities. In many countries it is necessary to irrigate the cane fields and in these countries the cane is planted down in furrows. The furrows are of course formed by spaced-apart parallel ridges in order to confine the flow of irrigating water to the cane plants in the particular rows. Preparation of a field with suitable furrows requires considerable work and is relatively costly. Thus one of the goals of a cane harvester should be to harvest the cane without destroying the furrows in the field.

It is a principal object of this invention to provide a rotating tubular cutting mechanism with a relatively large diameter circular mouth projecting forwardly and somewhat downwardly and having a knife edge at its periphery so that upon rotation thereof the standing cane stalks may be cut closely adjacent the ground or immediately therebeneath to gain and collect all of the valuable cane stalk with the high sugar content.

An important object of this invention is the provision of means in a cone-shaped cutter for stalks and particularly of the cane type wherein the stalks are cut at their butt ends and by means of a depressor bar the stalks are inclined forwardly away from the harvesting machine in such a manner that the butt ends ride upwardly and through the cutting cone to a position where they are fed longitudinally rearwardly by cooperating roll means or the like into further treating mechanism or if no treating is desired, then to trailing wagons or the like or for deposit on the ground and later pick up.

Another important object of this invention is to supply a feeding mechanism for cane harvesters or the like wherein the feed mechanism includes a bell-shaped stalk cutter to effect stalk cutting and pick-up, and means for regulating the elevation of the cut of the stalks by varying the angular position of the bell-shaped stalk cutter and providing feeding means for moving the cut stalks butt ends first rearwardly through the bell-shaped stalk cutter for subsequent handling.

Another and still further important object of this invention is to provide a cone-shaped harvester cutting mechanism which is rotatable and has a wide circular mouth at its forward end with a knife edge around its periphery to effect a cutting of standing stalks and including spiral conveyor means within the cone-shaped cutting mechanism for delivering the stalks rearwardly for subsequent handling.

Another and still further important object of this invention is to include in a cone-shaped harvesting element a stationary member extending along one side thereof and within the cone to prevent the harvested crop material from rotating within the cone rather than feeding longitudinally therethrough.

Other and further important objects and advantages will become apparent from the disclosures in the following specification and accompanying drawings.

Figure 1:
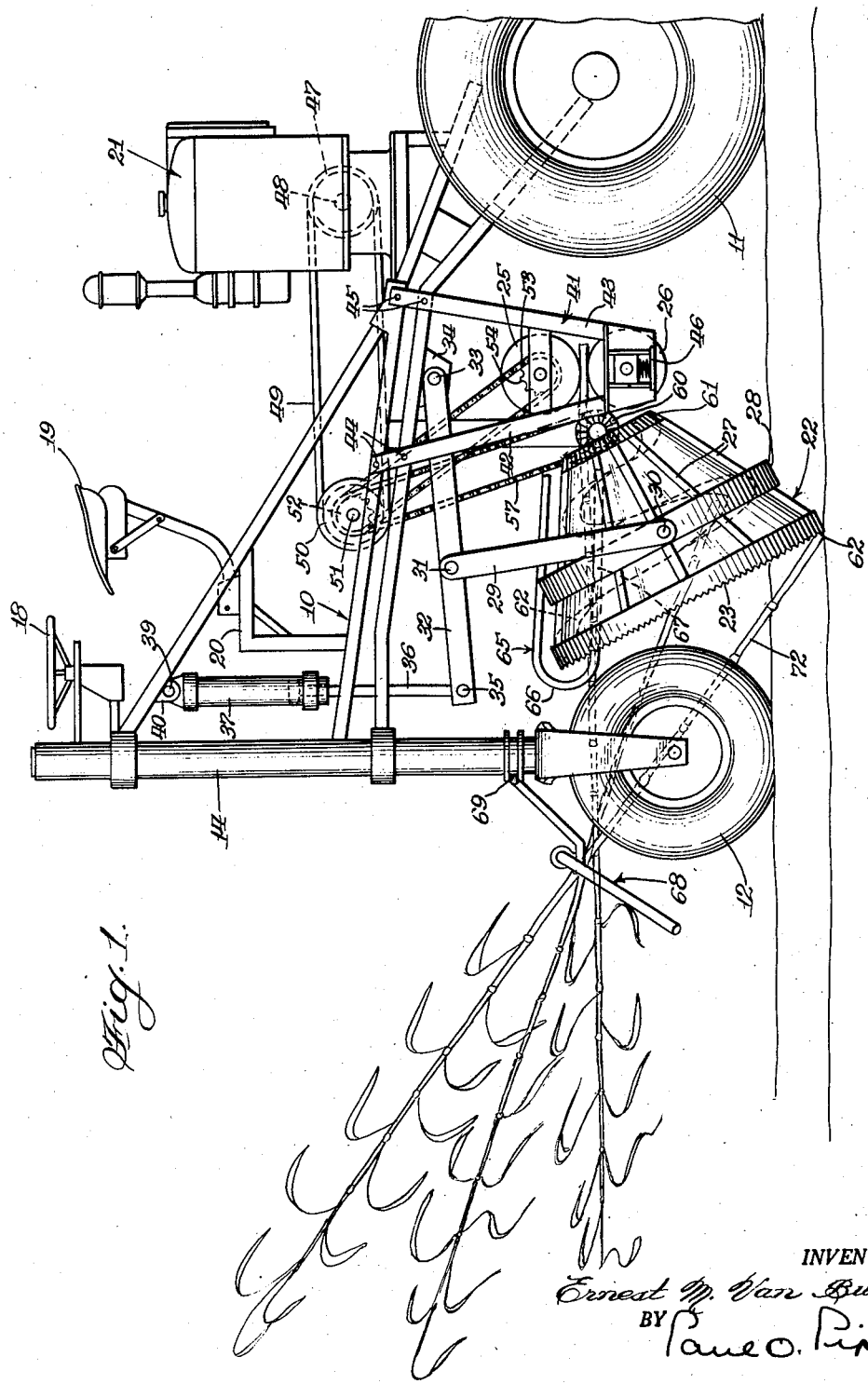
Figure 1 is a side elevational view of the cane harvester employing the cone-shaped harvesting unit of this invention.

As shown in the drawings the reference numeral 10 indicates generally a frame-supporting structure which is mounted at its rear portion on laterally spaced apart ground engaging traction wheels 11 and at its forward portion on laterally spaced apart ground engaging dirigible wheels 12 and 13. The front steerable wheels 12 and 13 are mounted on vertically disposed frame or bolster members 14 and 15 having wheel supporting fork members 16 and 17 respectively to receive the dirigible wheels 12 and 13. The steering of the dirigible wheels 12 and 13 is accomplished by a hand steering wheel 18 disposed at the top of the frame members 14 and 15 and substantially midway therebetween and closely adjacent an operator's seat 19 which is mounted on a station or platform 20 which in turn is carried on the frame-supporting structure 10. An engine 21 to supply rotative power is mounted on the frame structure 10 just forwardly of the large traction wheels 11 to impart rotational drive to the various operating elements of this harvester.

The objects of this invention have been set forth above and it is evident that the harvester is employed for the purpose of harvesting cane or other stalk type crops. Cane stalks grow relatively tall, possibly 10 to 12 feet in height, and in very dense stools. There are many shoots or stalks growing from one stool or root structure. In ideal conditions the cane stalks stand vertically but oftentimes storms will have caused the stalks to be bent over and tangled with stalks from adjacent stools either in the same or adjacent rows. Thus the cane to be harvested presents a difficult problem. The primary harvesting element of this invention includes a tubular harvesting member 22 which may be cylindrical or cone shaped. The harvesting element 22 is equipped with a forwardly projecting saw toothed circular cutting edge 23 extending around its full circumference at the wide open end of the cone or tubular member. The bell or cone 22 is disposed generally on a longitudinal axis and inclined slightly downwardly with its large opening extending forwardly and its small opening extending rearwardly. When the harvester is moved through a field of standing cane the cone cutter scoops up the cane stalks as it cuts them at their butt ends. The rearward portion of the cone member 22 shown at 24 has a narrow or restricted circumference and is located substantially at the juncture between a pair of vertically spaced apart cooperative feed rollers 25 and 26 which are journally mounted in said supporting structure.

The cone or bell-shaped member 22 is provided with a solid wall from the wide open mouth bounded by the cutting edge 23 to the rearwardly disposed narrow discharge 24. Reinforcing staves or the like 27 are provided on the outside of the cone and taper inwardly from front to back thereof. An annular carrying ring or the like 28 surrounds the cone intermediate the forward and rearward ends thereof and is the means for effecting a raising and/or lowering of the forward end of the cutting cone. A link member 29 is pivotally or hingedly attached as at 30 to the ring 28 which surrounds the cone 22 as just described. The link 29 at its upper end is hingedly mounted at 31 to a generally longitudinally extending link arm member 32. The link arm 32 is pivotally mounted at its rear to a depending bracket 34 from the frame-supporting structure 10. Thus a raising and/or a lowering of the forward end of the link arm 32 will cause a concurrent raising and/or lowering of the cone member 22. The forward end of the link arm 32 is hingedly mounted at 35 to a piston rod 36 which is disposed generally vertically and parallel to the front wheel bolster 14 or the like. The piston rod 36 depends from a fluid cylinder 37 within which a piston 38 is adapted to have reciprocal movement. As shown in Figure 1 the upper end of the fluid cylinder 37 is hingedly mounted at 39 to a downwardly depending bracket 40 from the frame supporting structure 10. Thus when fluid under pressure is admitted to the cylinder 37 the piston 38 is moved downwardly to the position as shown in Figure 1 causing the cone cutting member 22 to be swung downwardly by reason of the linkage 29 and 32. In this position as shown in Figure 1 the saw tooth circular cutter 23 is actually digging into the ground so that as it cuts the cane there is an assurance it will obtain that portion of the cane having the greatest sugar content. However if it should be desired to have the cone shaped cutter cut the stalks at a higher level or if it is desired to transport the harvester the fluid cylinder 37 is operated in reverse direction whereby fluid is admitted to the lower end of the cylinder causing the piston 38 to raise upwardly and thus also raise the piston rod 36 and the link arm 32 whereupon the cone cutter is simultaneously raised. It is thus quite evident that the relative position of the cone cutter 22 is determined by the position of the piston 38 within the cylinder 37. This can be controlled to gain any desired adjustable setting for the cone cutter.

A downwardly depending frame-like bracket 41 from the supporting structure 10 is adapted to carry the cooperative stalk feeding rolls 25 and 26 and also the rearward end of the cone shaped cutter 22. The bracket 41 includes a forward frame member 42 and a rearward frame member 43. These respective frame members are riveted or otherwise fastened at 44 and 45 to the frame structure 10. The frame members 42 and 43 converge toward each other as they progress downwardly and are joined at their lower ends by a connecting member 46. The cooperative feed rolls 25 and 26 are journalled on this cradle-like bracket member 41.

Figure 2:
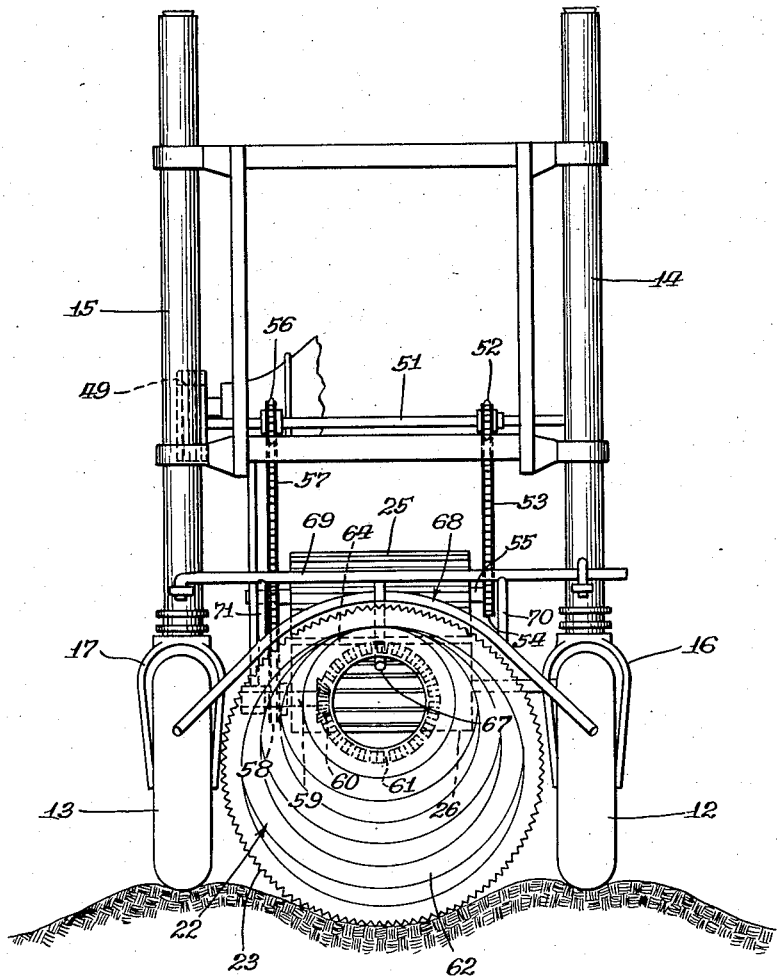
Figure 2 is a front elevational view of the device as shown in Figure 1.

The engine 21 is equipped with a V-pulley 47 at one end thereof on an engine shaft 48. A V-belt 49 is carried in the V-pulley 47 and is adapted to impart rotational drive from the engine 21 to a spaced apart V-pulley 50. The V-pulley 50 is mounted on a shaft 51 which extends laterally across the harvester of this invention. As shown in Figure 2 the V-pulleys 47 and 50 are multiple in number and the V-belt 49 is also multiple in number so that there is made available a greater driving torque between driving and driven members. The shaft 51, as shown in Figure 2, is equipped with a sprocket 52 having a chain 53 projecting downwardly to engagement with a sprocket 54 on a transversely disposed shaft 55. It should be noted that the shaft 55 carries the upper feed roller 25 and thus rotational drive is delivered from the engine 21 to the upper stall feeding roll 25. The lower feed roller 26 is driven indirectly by reason of its engagement with the upper feed roller 25 but it is not separately driven.

A second sprocket 56 is provided on the transversely disposed shaft 51 and as in the manner for the sprocket 52 this sprocket 56 is equipped with a chain 57 for delivering drive downwardly to a sprocket 58 mounted on a shaft 59. The shaft 59 is journalled within the depending bracket frame 41 and has mounted on its other end thereof a bevel gear 60. The bevel gear 60 is in engagement with the cooperating ring type bevel gear 61 which forms a part of and outlines the small opening in the upper restricted end 24 of the cone cutter member 22. In other words the bevel gear 61 rotates with the cone 22 and forms an integral part thereof. Thus as the engine 21 is driven the cone 22 is similarly driven through the driving arrangement just described. The employment of the engaging bevel gears 60 and 61 facilitates the angular positioning of the cone cutter 22 as the cone cutter is raised and/or lowered by reason of operation of the fluid cylinder and pistons 37 and 38 respectively.

As shown in both of Figures 1 and 2 a cone cutter 22 in addition to including an annular saw tooth cutting blade 23 at the forward end thereof further includes a spiral rib member 62 which causes any stalks which are delivered centrally of the cone to be fed upwardly to the restricted rearward end of the cone whereupon the stalks then pass through the opening 63 defined by the ring-shaped bevel gear 61. From here the ends of the stalks are delivered directly to the juncture 64 between the upper and lower feed rolls 25 and 26. A rod-like member is provided on the device above the cone-shaped cutter and is affixed to the lifting link 29. The rod 65 projects forwardly and is curved downwardly and thence rearwardly as shown at 66 where a rearwardly extending portion 67 is disposed within the cone-shaped cutter adjacent the top or upper end thereof and within the spiral rib 62. This rod 65 and particularly its lower rearwardly extending portion 67 prevents a winding of the stalks around the full annular periphery of the cone cutter 22 and causes the stalks when they reach the upper side of the cone to be positively moved rearwardly by the spiral feed rib 62.

At the forward end of the machine there is provided a generally U-shaped stalk bending bar 68 which as shown in Figure 2 has a width slightly in excess of the diameter of the large forward end of the cone cutter 22 and the flared ends or legs of the U member are disposed forwardly of the dirigible wheels 12 and 13. A supporting bracket or the like 69 is provided between the bolster or frame supports 14 and 15 to carry downwardly depending arms 70 and 71 to which the bending bar 68 is welded or otherwise fastened. Thus the U-shaped stalk bending member is held in fixed position at the forward end of the harvester to receive standing stalks and bend them forwardly and downwardly.

In the operation of the machine the harvester is propelled through a field of standing cane stalks and down a row of stalks whereby the butt ends of the stalks are cut from the root structure or stools by reason of the rotation of the saw tooth cutter 23. As shown in Figure 1 the cane stalks represented by the numeral 72 are preliminarily bent downward and forwardly by the bending bar 68 and the butt ends are encouraged to ride up inside the cone member 22 by reason of the spiral rib 62. The stalks then find their way up to the rearward opening of the cone at 63 to the juncture 64 between the feed rolls 25 and 26. At this point of course the feed rolls grip the stalks and hurriedly pull them through for delivery out the rear of the machine. The stalks may be treated further or discharged as desired.

Numerous details of construction may be varied throughout a wide range without departing from the principles disclosed herein and I therefore do not propose limiting the patent granted hereon otherwise than as necessitated by the appended claims.

What is claimed is:

1. A stalk harvester comprising a supporting structure, laterally spaced apart ground engaging wheels for said supporting structure, a cone-shaped harvesting element having a large opening at one end and a small opening at the other end, means adjustably carrying said cone-shaped harvesting element on said supporting structure on a generally longitudinally extending axis and inclined downwardly from rear to front with its large opening facing downwardly and forwardly and its small opening facing upwardly and rearwardly, cooperative stalk feeding rolls journaled on said supporting structure and disposed transversely to the line of draft of said harvester, said small opening of the cone having a relatively fixed proximate location to said cooperative rolls, said cone having a cutting edge projecting forwardly and extending around the circumference of the large opening of the cone-shaped harvesting element, means for rotating said cone-shaped harvesting element, and said cone-shaped harvesting element having a spiral rib on the inside surface thereof extending from the large forward opening to the small rearward opening to cause material delivered thereto to be raised from the low forward end to the high rearward discharge end for direct delivery to said cooperative stalk feeding rolls.

2. A device as set forth in claim 1 in which a rod member is mounted on said supporting structure and projects inwardly of the cone-shaped harvesting element adjacent the top thereof whereby stalk material within the cone element is urged rearwardly when it is delivered upwardly by the spiral rib.

3. A device as set forth in claim 1 in which said means adjustably carrying said cone shaped harvesting element comprises a link arm hingedly mounted at one end thereof on said supporting structure, means interposed between the other end of said hinged arm and the supporting structure for varying the angle of inclination of said hinged arm with respect to said supporting structure, said cone shaped harvesting element having its small opening end hinged on said supporting structure whereby it remains in its proximate location to said stalk feeding cooperative rolls, and link means pivotally joined at one end thereof to said hinged arm intermediate its ends and pivotally joined at its other end to said cone shaped harvesting element intermediate its ends whereby a swinging of said hinged arm causes a corresponding swinging of said cone element about its hinged end as a center.

References Cited in the file of this patent

UNITED STATES PATENTS

| | | |
|---|---|---|
| 535,080 | Roberts et al. | Mar. 5, 1895 |
| 1,419,743 | Lohberger | June 13, 1922 |
| 2,748,552 | Pool et al. | June 5, 1956 |

FOREIGN PATENTS

| | | |
|---|---|---|
| 145,617 | Australia | Mar. 6, 1952 |